(No Model.)
J. D. SMITH.
CHECK ROW FOR CORN PLANTERS.
No. 308,336. Patented Nov. 18, 1884.
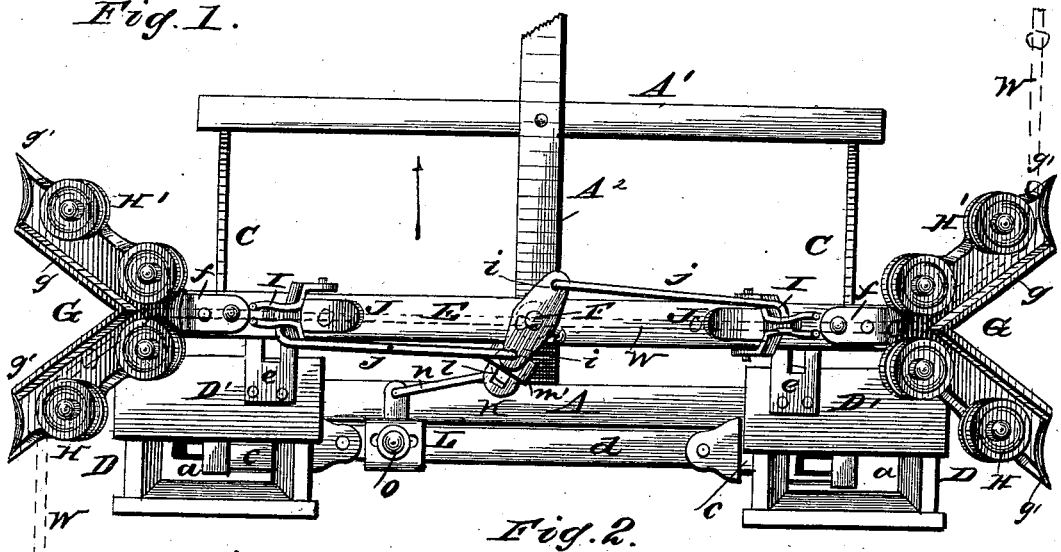
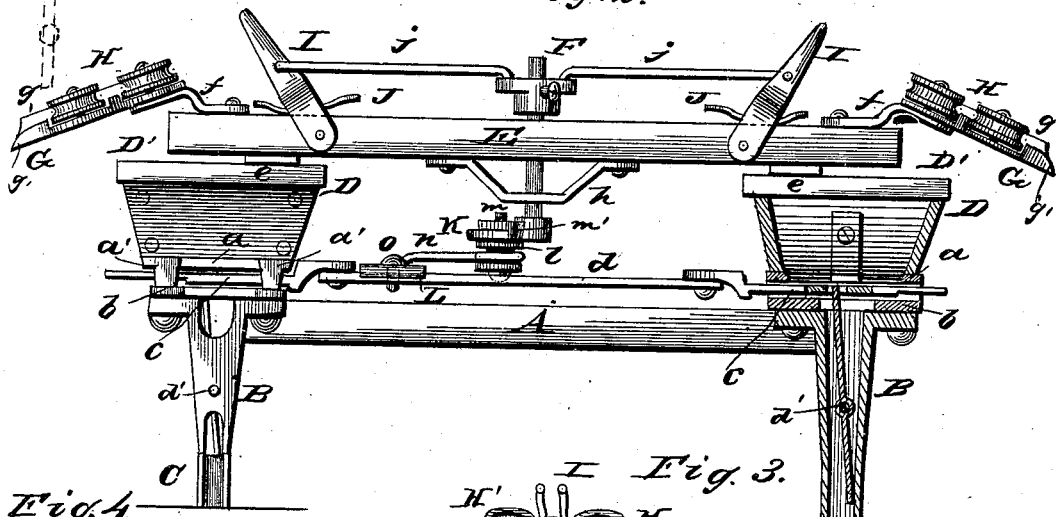
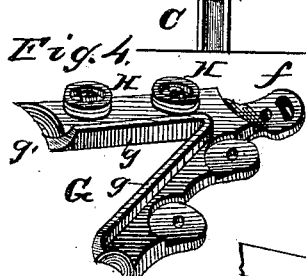
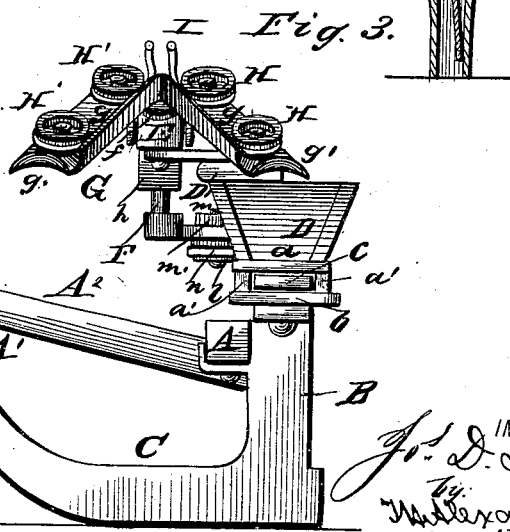
WITNESSES
Phil C. Dietrich
T. R. Keyworth
INVENTOR
Jos. D. Smith
by H. S. Alexander
ATTORNEY United States Patent Office.

JOSEPH D. SMITH, OF ROCKFORD, ILLINOIS.

CHECK-ROW FOR CORN-PLANTERS.

SPECIFICATION forming part of Letters Patent No. 308,336, dated November 18, 1884.

Application filed July 2, 1884. (No model.)

*To all whom it may concern:*

Be it known that I, JOSEPH D. SMITH, of Rockford, in the county of Winnebago and State of Illinois, have invented certain new and useful Improvements in Check-Rows for Corn-Planters; and I do hereby declare that the following is a full, clear, and exact description thereof, reference being had to the accompanying drawings, and to the letters of reference marked thereon, which form part of this specification, in which—

Figure 1 is a top view of my improved check-row planter. Fig. 2 is a rear elevation of the same and a vertical section through one of the seed-dropping devices. Fig. 3 is an elevation of one end of the machine. Fig. 4 is a perspective view of one of the angular pulley-bearings, one of the pulleys being removed to show the recess or depression for it.

This invention relates to check-row corn-planters wherein the dropping devices are automatically actuated by knots on a rope or wire stretched across the field during the progress of the machine from one end of the field to the other; and it consists in certain novel devices combined with dropping devices of a suitable kind, whereby the operation of dropping the grains of corn in hills is accurately and simply effected, and also whereby the check-row devices are adjustable for different droppers and for dropping at different distances, all of which will be fully understood from the following description, when taken in connection with the annexed drawings.

A designates the main beam of the machine, to which the seed-tubes or tubular standards B B of the curved runners and drill-openers C C are rigidly secured. The rear ends of these drill-openers C C are bifurcated, so that the grains of corn fall between the bifurcations into the ground. The front upturned ends of the drill-openers are secured to angle-irons which are bolted rigidly to a front transverse beam, A'. To this beam A', and also to the main beam A at the middle of the length of the same, the draft-pole A² is rigidly secured.

D D designate the seed-boxes or hoppers, having metal cellular bottoms *a a*, each constructed with four lugs, *a'*, mounted on open frames *b b*, which are screwed to the lugs of said bottoms *a*, so as to leave spaces for the free play of perforated reciprocating slides *c c*, which are connected together by a rod, *d*. Each slide *c* is made of two longitudinally-adjustable pieces, by which the size of the openings through it can be regulated for dropping different charges, and each slide *c* has a recess in its bottom, that receives a projection on the upper end of a vibrating dropping-valve or cut-off having its fulcrum at *d'*. These features are not herein claimed, and are described merely for the purpose of showing one kind of dropping device to which the invention which I am about to describe is applicable. The standards or seed-tubes B B are rigidly secured to the lower plates or frames, *b b*, of the hoppers or seed-boxes D D. The front halves of the hopper-covers D' D' are rigidly secured to the hoppers, and to these half-covers strong longitudinal slotted plates *e e* are rigidly secured, which project forward, as shown in Fig. 1. To these longitudinally-slotted plates *e e*, I rigidly but adjustably secure, by means of screws or bolts, a transverse beam, E, to the extremities and on top of which are secured, by means of angle-brackets *f f*, (having more or less elasticity,) V-shaped castings G G, the inner edges of which have raised flanges *g g*, which afford guides for the knotted wire or cord W, that actuates the dropping devices. These angle-castings G G are recessed on their upper surfaces, which are inclined outward and downward, and into these recesses are applied the lower parts of grooved pulleys H H', which afford rolling guides for the knotted wire and keep it in place on the machine. The outer ends of the angle-castings G G are scored out and constructed with curved lips *g' g'*, as shown in Fig. 1.

The object of seating the lower ends of the rolling guide-pulleys H H into recesses made in the castings G G is to leave unobstructed surfaces on these castings for guiding the knotted cord or wire.

At the middle of the length of the beam E, and passed vertically through it, is an oscillating post, F, which has a lower bearing-stirrup, *h*. To this post is rigidly but adjustably secured an oscillating hub having arms *i i* of equal length, which have their bearings on the said beam E, which arms are connected by rods *j j* to bifurcated vibrating arms I I, pivoted to the beam E near its ends and equidistant therefrom. Below the lower forks of the said vibrating arms I I, and secured on top of the beam E, are bow springs J J, the free ends of which are struck by their respective arms at each vibration thereof, thus preventing undue shock and concussion.

To the lower end of the oscillating post F is rigidly secured a slotted arm, K, to which is rigidly but adjustably secured a grooved pivot-wheel, *l*, by means of a bolt, *m*, and a saddle, *m'*.

To the pivot-wheel *l* is loosely attached one end of a connecting-rod, *n*, the opposite end of which is pivoted to the front arm of a T-shaped plate, L, which is slotted in a direction with respect to the length of the rod *d*, and rigidly but adjustably secured to this rod by means of a screw and washer or a bolt, *o*.

The operation of my invention is as follows: A wire or rope knotted in the well-known manner is stretched across the field and suitably secured at its ends. If the machine is to be moved in the direction of the arrow on Fig. 1, the knotted wire is passed between the guide-rolls H and flange on the left-hand side of the machine, carried across the machine between the forks of the vibrating arms I I, and passed between the guide-rolls H' and their flange on the right-hand side of the machine. If the machine is to be moved in a direction opposite to that indicated by said arrow, the position of the wire is reversed—that is to say, it is passed in between the rolls H' and their guide on the right-hand side of the machine.

As the machine progresses across the field, the knots on the wire W will successively strike the forked arms I I and transmit a rectilinear reciprocating motion to the seed-slides through the medium of the devices above described. The upper forked ends of the actuating-arms I I are moved simultaneously toward and from each other. Consequently each knot on the wire W as it passes across the machine will transmit two movements to the slides, or, in other words, each knot will cause two drops of corn. By adjusting the pivot-wheel toward or from the axis of the oscillating post F, the strokes of the slides can be regulated, and by adjusting the plate L on the rod *d* an even stroke of the slides can be obtained. The post F may be also adjustable vertically, to adapt the parts to the heights of seed-boxes of different machines.

Having described my invention, I claim as new—

1. The combination, with the frame of a check-row, of the angle-castings inclined outward and downward and recessed upon their upper surfaces to form seats for the grooved pulleys, substantially as and for the purposes specified.

2. The combination, with the frame of the check-row, of the angle-castings having ledges at their inner edges and recessed upon their surfaces, and the pulleys located in said recesses, whereby the knotted cord is guided, substantially as and for the purposes specified.

In testimony that I claim the foregoing as my own I affix my signature in presence of two witnesses.

JOSEPH D. SMITH.

Witnesses:
W. T. ROBERTSON,
M. STARR.